(No Model.)

B. G. LAMME.
ELECTRIC MOTOR FOR STREET CARS.

No. 513,401. Patented Jan. 23, 1894.

WITNESSES:
George Brown Jr.

INVENTOR
Benjamin G. Lamme
BY
Terry and Mackay
ATTORNEYS

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

ELECTRIC MOTOR FOR STREET-CARS.

SPECIFICATION forming part of Letters Patent No. 513,401, dated January 23, 1894.

Application filed March 27 1893. Serial No. 467,750. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Mountings for Car-Motors, (Case No. 546,) of which the following is a specification.

My invention relates to a form of mounting for electric motors on cars which are run by electrical energy.

The object of my invention is to provide such a form of gearless motor, and mounting therefor as will bring the least possible strain upon the axle of the car, while at the same time making provision for such oscillations of the field-magnets of the motor as are necessarily incident to the use of motors on cars.

Another object of my invention is to provide a car motor, wherein the armature is mounted directly upon the axle, and wherein the field-magnets are so supported upon the axle and the body of the car, as to prevent any racking or twisting of the axle thereby, and to relieve said axle from undue opposition to rotation through friction.

My invention is illustrated in the accompanying drawings, wherein—

Figure 1:
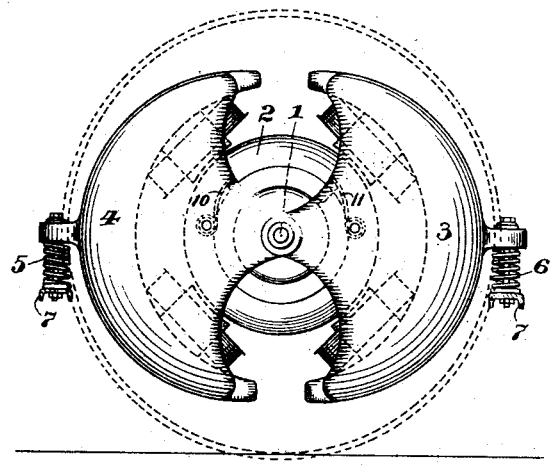
Figure 2:
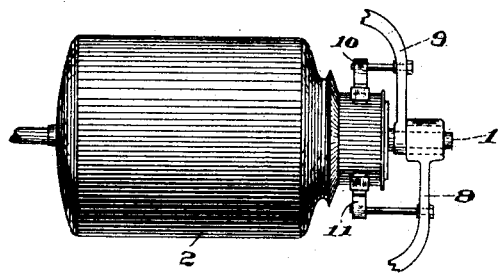

Figure 1 is a side view of my form of motor and hanging, and Fig. 2 is a detail view of the form of sleeve whereby the field-magnets are attached to the axle.

I have illustrated in Fig. 1, a four-pole motor, but it is evident that the principle of my invention is equally applicable to a motor having any other desired number of poles.

In Fig. 1, the axle of the car is shown at 1, and upon this axle is mounted the armature 2 of the motor.

The field-magnets, 3 and 4, are provided with two pairs of poles, as shown, and these pairs are provided with iron yokes preferably of about the form shown, and so arranged that the center of gravity of these field magnets shall be as far as possible with convenience from the axle. The rear ends of these field-magnets are supported preferably by means of springs 5 and 6 from the car body 7, in a manner already known in the art. By thus placing the center of gravity of the field-magnets as far as possible from the axle, the latter is relieved to a great extent from the weight of the field-magnets, or, to express it more accurately, this weight is transmitted to the ends of the axles through the car body, instead of being carried by the middle of the axle, and thus exerting a great bending effort thereon.

In order that the various often violent movements of the car shall not be transmitted to the axle, the two field-magnets are supported upon the axle by means of sleeves, whereby rotation around the axle is permitted. As shown in Fig. 2 one of these sleeves is made to surround the other on each side of the armature. In this figure, the inner sleeve, which supports one of the field magnets, is shown at 9, and that supporting the other field-magnet, surrounds the former, and is shown at 8. By thus sleeving one field-magnet upon the other at each side of the armature, I avoid all tendency to twist or bend the axle laterally as might occur upon lateral movements of the two field-magnets in opposite directions. It is evident that the outer sleeves for both ends of the armature may belong to the same field-magnet or that, if desired, the sleeves at the two ends of each field-magnet may be respectively the inner and the outer sleeves. A further benefit derived from this mode of sleeving the field-magnets is that the tendencies of each magnet to swing toward the axle counteract each other, and thus relieve the axle from great friction otherwise opposing its revolution.

In the construction shown in Fig. 1 I have illustrated as an example that form of machine wherein the coils are connected to commutator bars placed about ninety degrees removed from the actual position of the coil in the magnetic field. It is evident therefore, that the coils which are receiving current directly from the brushes are those midway between the poles and the line of commutation will readily pass through points midway between the field-magnet poles, even though the brushes are not shown as so placed. Proper commutation may be attained in this form of motor over a considerable range of the commutator, and it is one advantage of my arrangement that the brushes are automatically connected at or near the line of commutation in spite of the swinging of the field-magnets around the armature. This advantage is not confined solely to the type of motor shown in the drawings.

It is evident that a motor of the kind above described may be used upon both axles or upon one, as desired.

The arrangement which I have described above permits of the use of a motor of a given power within a minimum space, and at the same time avoids as far as possible strains of every kind upon the axle.

What I claim is—

1. In a motor for electric cars, an armature mounted upon the axle of the car, and two field-magnets independently sleeved upon the axle and suspended at their rear ends from the car body, substantially as described.

2. In a motor for electric cars, an armature mounted directly upon the car axle, and two field-magnets independently sleeved upon the axle at each side of the armature, and having their contiguous sides cut away, so as to bring the centers of gravity as far as possible from the axle, said field-magnets being supported from the car body, substantially as described.

3. In a motor for electric cars, an armature mounted upon the axle of the car, and two field-magnets independently sleeved upon the axle, and suspended at their rear ends from the car body by spring mountings, substantially as described.

4. In a motor for electric cars, an armature directly mounted upon the axle of the car, and two field-magnets independently sleeved upon said axle, one supporting sleeve at each end of the armature surrounding the other, substantially as described.

In testimony whereof I have hereunto subscribed my name this 24th day of March, A. D. 1893.

BENJ. G. LAMME.

Witnesses:
JAMES WM. SMITH,
HAROLD A. MACKAYE.